US011350629B2

(12) United States Patent
Sada et al.

(10) Patent No.: US 11,350,629 B2
(45) Date of Patent: Jun. 7, 2022

(54) METHOD OF CONTROLLING WEEDS

(71) Applicant: SUMITOMO CHEMICAL COMPANY, LIMITED, Tokyo (JP)

(72) Inventors: Yoshinao Sada, Kasai (JP); Yoshinobu Jin, Kasai (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/474,577

(22) Filed: Sep. 14, 2021

(65) Prior Publication Data

US 2021/0400973 A1 Dec. 30, 2021

Related U.S. Application Data

(63) Continuation of application No. 17/151,851, filed on Jan. 19, 2021, which is a continuation of application No. 16/983,351, filed on Aug. 3, 2020, now Pat. No. 10,897,904, which is a continuation of application No. 16/681,262, filed on Nov. 12, 2019, now Pat. No. 10,772,329.

(30) Foreign Application Priority Data

Dec. 26, 2018 (JP) .............................. JP2018-242255
May 31, 2019 (JP) .............................. JP2019-102239

(51) Int. Cl.
*A01N 43/84* (2006.01)
*A01P 13/00* (2006.01)

(52) U.S. Cl.
CPC .............. *A01N 43/84* (2013.01); *A01P 13/00* (2021.08)

(58) Field of Classification Search
None
See application file for complete search history.

(56) References Cited

U.S. PATENT DOCUMENTS

| 8,754,008 B2 | 6/2014 | Witschel et al. |
| 10,555,528 B1 | 2/2020 | Sada |
| 2015/0299725 A1 | 10/2015 | Lerchl et al. |
| 2018/0368411 A1 | 12/2018 | Kraus et al. |
| 2019/0254277 A1 | 8/2019 | Jin |
| 2020/0359631 A1 | 11/2020 | Winter et al. |

FOREIGN PATENT DOCUMENTS

| CN | 105230636 A | 1/2016 | |
| CN | 105409973 A | 3/2016 | |
| JP | 2012-530098 A | 11/2012 | |
| JP | 2019137701 A * | 8/2019 | ............. A01N 43/54 |
| WO | WO-2019030095 A2 * | 2/2019 | ............. A01N 57/20 |
| WO | WO-2019030097 A2 * | 2/2019 | ............. A01N 43/54 |
| WO | WO-2019030098 A1 * | 2/2019 | ............. A01N 43/54 |
| WO | WO 2021/151743 A1 | 8/2021 | |

OTHER PUBLICATIONS

Culpepper, et al., "Glyphosate-resistant Palmer amaranth (*Amaranthus palmeri*) confirmed in Georgia", Weed Science 54, 2006, pp. 620-626.
Legleiter, et al., "Glyphosate and Multiple Herbicide Resistance in Common Waterhemp (*Amaranthus rudis*) Populations from Missouri", Weed Science 56, 2008, pp. 582-587.
International Search Report dated Feb. 18, 2020 in PCT/JP2019/050058, (with Partial English Translation).

* cited by examiner

*Primary Examiner* — Alton N Pryor
(74) *Attorney, Agent, or Firm* — Oblon, McClelland, Maier & Neustadt, L.L.P.

(57) ABSTRACT

A herbicidal composition including trifludimoxazin and at least one herbicide selected from the group consisting of glufosinate, glufosinate-P, and ammonium and sodium salts, wherein a weight ratio of trifludimoxazin to the herbicide is from 1:5 to 1:100.

11 Claims, No Drawings

METHOD OF CONTROLLING WEEDS

CROSS-REFERENCE TO RELATED APPLICATIONS

This application is a continuation of and claims the benefits of priority to U.S. application Ser. No. 17/151,851, filed Jan. 19, 2021, which is a continuation of and claims the benefits of priority to U.S. application Ser. No. 16/983,351, filed Aug. 3, 2020, now U.S. Pat. No. 10,897,904, which is a continuation of and claims the benefits of priority to U.S. application Ser. No. 16/681,262, filed Nov. 12, 2019, now U.S. Pat. No. 10,772,329, which claims priority under 35 U.S.C. § 119(b) to Japanese Application No. 2018-242255, filed on Dec. 26, 2018, and Japanese Application No. 2019-102239, filed on May 31, 2019. The entire contents of all of the above applications are incorporated herein by reference.

TECHNICAL FIELD

The present invention relates to a method of controlling weeds.

BACKGROUND ART

Heretofore, as the method of controlling weeds, a method in which trifludimoxazin is applied is known (see U.S. Pat. No. 8,754,008). Glyphosate-resistant weeds are known (see Weed Science 54 (2006), 620-626 and Weed Science 56 (2008), 582-587).

SUMMARY OF THE INVENTION

The object of the present invention is to provide a method whereby it becomes possible to exert an excellent control effect in the control of a weed.

The present inventors have found that trifludimoxazin can exhibit an excellent control effect particularly against glyphosate-resistant weeds, and can control glyphosate-resistant weeds and can also reduce the population of glyphosate-resistant weeds.

The present invention includes the following aspects [1] to [6].
[1] A method of controlling glyphosate-resistant weeds, including the step of applying 5 to 200 g per 10000 m² of trifludimoxazin to the glyphosate-resistant weeds or a habitat of the glyphosate-resistant weeds.
[2] The method according to [1], wherein the glyphosate-resistant weed is a weed belonging to the genus *Amaranthus*.
[3] The method according to [1], wherein the glyphosate-resistant weed is *Amaranthus palmeri*.
[4] The method according to [1], wherein the glyphosate-resistant weed is *Amaranthus palmeri* in which the number of copies of EPSPS gene is increased.
[5] The method according to any one of [1] to [4], wherein the habitat of the glyphosate-resistant weed is a cultivation area for a crop.
[6] The method according to [5], wherein the crop is any one selected from the group consisting of soybean, corn, cotton, rapeseed, rice, wheat, barley, sugar cane, sugar beet, sorghum and sunflower.
[7] The method according to [5], wherein the crop is a crop imparted with tolerance to trifludimoxazin.

According to the method of controlling weeds of the present invention, it becomes possible to achieve a high herbicidal effect.

DETAILED DESCRIPTION OF THE INVENTION

The method of controlling glyphosate-resistant weeds (also referred to as "present method", hereinafter) includes the step of applying trifludimoxazin (also referred to as a "present compound", hereinafter).

In the present method, the wording "a plant is resistant to glyphosate" refers to a state that the killing or the irreparable inhibition of the growth of the plant cannot be achieved by glyphosate or a salt thereof at an amount that is four times a lowest amount required for the killing or the irreparable inhibition of the growth of a wild-type weed of the same species. A weed of this type is referred to as a "glyphosate-resistant weed".

Examples of the habitat of glyphosate-resistant weeds in the present method includes an area where a glyphosate-resistant weed is growing and an area where a glyphosate-resistant weed will grow.

The present method can be applied to a non-agricultural land or an agricultural land. Examples of the agricultural land include cultivation areas for the following plants.

Crops: corn, rice, wheat, barley, rye, oat, sorghum, cotton, soybean, peanut, buckwheat, sugar beet, rapeseed, sunflower, sugar cane, tobacco, triticale, kidney bean, lima bean, black-eyed pea, mung bean, urd bean, scarlet runner bean, ricebean, moth bean, tepary bean, broad bean, pea, chickpea, lentil, lupin, pigeon pea, alfalfa, etc.;

vegetables: Solanaceae vegetables (eggplant, tomato, green pepper, hot pepper, potato, bell pepper, etc.), Cucurbitaceae vegetables (cucumber, pumpkin, zucchini, watermelon, melon, squash, etc.), Cruciferae vegetables (Japanese radish, turnip, turnip, horseradish, kohlrabi, Chinese cabbage, cabbage, brown mustard, broccoli, cauliflower, etc.), Compositae vegetables (burdock, garland chrysanthemum, artichoke, lettuce, etc.), Liliaceae vegetables (Welsh onion, onion, garlic, asparagus, etc.), Umbelliferae vegetables (carrot, parsley, celery, parsnip, etc.), Chenopodiaceae vegetables (spinach, Swiss chard, etc.), Labiatae vegetables (Japanese mint, mint, basil, lavender, etc.), strawberry, sweat potato, yam, taro, flowers and ornamental plants, foliage plants, etc.;

fruit trees: pome fruits (apple, common pear, Japanese pear, Chinese quince, quince, etc.), stone fruits (peach, plum, nectarine, Japanese plum, cherry, apricot, prune, etc.), citrus plants (Satsuma mandarin, orange, lemon, lime, grapefruits, etc.), nuts (chestnut, walnut, hazel nut, almond, pistachio, cashew nut, macadamia nut, etc.), berry fruits (blueberry, cranberry, blackberry, raspberry, etc.), grape, persimmon, olive, loquat, banana, coffee, date, coconut, etc.;

trees other than fruit trees: tea, mulberry, flowering trees, street trees (ash tree, birch, dogwood, eucalyptus, ginkgo, lilac, maple tree, oak, poplar, cercis, Chinese sweet gum, plane tree, zelkova, Japanese arborvitae, fir tree, Japanese hemlock, needle juniper, pine, spruce, yew), etc.; and lawngrasses, and pasture.

It is preferred that the present method can be applied to a cultivation area for a crop. It is preferred that crop is any one selected from the group consisting of soybean, corn, cotton, rapeseed, rice, wheat, barley, sugar cane, sugar beet, sorghum and sunflower.

The above-mentioned "plant" may be a plant which can be produced by natural hybridization, a plant which can occur as the result of a mutation, a F1 hybrid plant, or a transgenic plant (also referred to as a genetically-modified plant"). These plants have properties such as a property that the tolerance to a herbicide is imparted, a property that a toxic substance against pests is accumulated, a property that the sensitivity to a plant disease is suppressed, a property that yield potential is increased, a property that the tolerance to a biological or non-biological stress factor is improved, a property that a substance is accumulated, and a property that a storage property or processability is improved.

The term "F1 hybrid plant" refers to a plant of a first filial generation which is produced by hybridizing two different varieties with each other, and is generally a plant which has a more superior trait to that of either one of parents thereof. i.e., has a hybrid vigor property. The term "transgenic plant" refers to a plant which is produced by introducing a foreign gene from another organism such as a microorganism into a plant and which has a property that cannot be acquired easily by hybridization breeding, induction of a mutation or a naturally occurring recombination under a natural environment.

Examples of the technique for producing the above-mentioned plants include a conventional breeding technique, a transgenic technique, a genome-based breeding technique, a new breeding technique, and a genome editing technique. The conventional breeding technique is a technique for producing a plant having a desirable property by mutation or hybridization. The transgenic technique is a technique for imparting a new property to a specific organism (e.g., a microorganism) by isolating a gene (DNA) of interest from the organism and then introducing the gene (DNA) into the genome of another target organism, or an antisense technique or an RNA interference technique which is a technique for imparting a new or improved property to a plant by silencing another gene occurring in the plant. The genome-based breeding technique is a technique for increasing the efficiency of breeding using genomic information, and includes a DNA marker (also referred to as "genome marker" or "gene marker") breeding technique and genomic selection. For example, the DNA marker breeding is a method in which an offspring having a desired useful trait gene is selected from many hybrid offsprings using a DNA marker that is a DNA sequence capable of serving as an indicator of the position of a specific useful trait gene on a genome. The analysis of a hybrid offspring of a plant at a seedling stage thereof using the DNA marker has such a characteristic that it becomes possible to shorten the time required for breeding effectively.

The genomic selection is such a technique that a prediction equation is produced from a genotype and genomic information both obtained in advance and then a property is predicted from the prediction equation and the genomic information without carrying out the evaluation of the genotype. The genomic selection can contribute to the increase in efficiency of breeding. A "new breeding technique" is a collective term for combinations of breeding techniques including molecular biological techniques. Examples of the new breeding technique include techniques such as cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). A genome editing technique is a technique for converting genetic information in a sequence-specific manner, and can perform the deletion of a nucleotide sequence, the substitution of an amino acid sequence, the introduction of a foreign gene, and the like. Examples of the tool for the technique include zinc-finger nuclease (ZFN), TALEN, CRISPR/Cas9, CRISPER/Cpf1 and meganuclease which can cleave DNA in a sequence-specific manner, and also include a sequence-specific genome modification technique using CAS9 nickase, Target-AID or the like which is produced by any one of the modification of the above-mentioned tools.

Examples of the above-mentioned plants include plants listed in genetically modified crops registration database (GM APPROVAL DATABASE) in an electric information site in INTERNATIONAL SERVICE for the ACQUISITION of AGRI-BIOTECH APPLICATIONS, ISAAA) (http://www.isaaa.org/). More specific examples of the plans include a herbicide-tolerant plant, a pest-resistant plant, a plant disease-resistant plant, a plant of which the quality (e.g., the increase or decrease in content, the change in composition) of a product (e.g., starch, an amino acid, a fatty acid) is modified, a fertility trait modified plant, a non-biological stress-tolerant plant and a plant of which a trait associated with growth or yield is modified.

Examples of the plant imparted with tolerance to herbicides are mentioned below.

The mechanism of the tolerance to a herbicide can be acquired by, for example, reduction of the affinity of the chemical substance for a target, rapid metabolism (e.g., decomposition, modification) of the chemical substance as the result of the expression of an enzyme capable of inactivating the chemical substance, or inhibition of the intake of the chemical substance into the body of the plant or the migration of the chemical substance in the body of the plant.

The plant imparted with tolerance to a herbicide by a transgenic technique includes plants each imparted with the tolerance to: a 4-hydroxyphenylpyruvate dioxygenase (abbreviated as "HPPD", hereinafter) inhibitor such as isoxaflutole and mesotrione; an acetolactate synthase (abbreviated as "ALS", hereinafter) inhibitor such as an imidazolinone-type herbicide containing imazethapyr and a sulfonylurea-type herbicide containing thifensulfuron-methyl; a 5-enolpyruvylshikimate 3-phosphate synthase (abbreviated as "EPSPS", hereinafter) inhibitor such as glyphosate; a glutamine synthetase inhibitor such as glufosinate; an auxin-type herbicide such as 2,4-D; an oxynil-type herbicide containing bromoxynil; and a protoporphyrinogen oxidase (abbreviated as "PPO", hereinafter) inhibitor such as flumioxazin by a transgenic technique. Preferred examples of the herbicide-tolerant transgenic plant include: a cereal such as wheat, barley, rye and oat; canola, sorghum, soybean, rice, rapeseed, sugar beet, sugar cane, grape, lentil, sunflower, alfalfa, a pome fruit, a stone fruit, coffee, tea, strawberry, wheat grass, and a vegetable such as tomato, potato, cucumber and lettuce; more preferably a cereal such as wheat, barley, rye and oat, soybean, rice, vine, tomato, potato, and a pome fruit.

Hereinbelow, specific examples of the herbicide-tolerant plant will be mentioned.

Plants tolerant to glyphosate herbicides: produced by introducing at least one of a glyphosate-tolerant EPSPS gene originated from *Agrobacterium tumefaciens* strain CP4 (CP4 epsps), a glyphosate metabolic enzyme gene of which the metabolic activity of glyphosate metabolic enzyme (glyphosate N-acetyltransferase) gene originated from *Bacillus licheniformis* is enhanced by a shuffling technique (gat4601, gat4621), a glyphosate metametabolic enzyme (glyphosate oxidase) gene originated from *Ochrobacterum anthropi* strain LBAA (goxv247) or an EPSP gene originated from corn and having a glyphosate tolerance mutation (mepsps, 2mepsps). Examples of the major plant include alfalfa (*Medicago sativa*), Argentina canola (*Brassica napus*), cotton (*Gossypium hirsutum* L.), creeping bentgrass (*Agrostis stolonifera*), corn (*Zea mays* L.), polish canola (*Brassica rapa*), potato (*Solanum tuberosum* L.), soybean (*Glycine max* L.), sugar beet (*Beta vulgaris*) and wheat (*Triticum*

*aestivum*). Some of the glyphosate-tolerant transgenic plants are commercially available. For example, a genetically-modified plant capable of expressing glyphosate-resistance-type EPSPS originated from an bacterium belonging to the genus *Agrobacterium* is commercially available by trade names including the trade name of "Roundup Ready (registered trade name)"; a genetically-modified plant capable of expressing a glyphosate metabolic enzyme originated from a bacterium belonging to the genus *Bacillus* and enhanced in a metabolic activity by a shuffling technique is commercially is commercially available by the trade names of "Optimum (registered trade name) GAT (trade name)", "Optimum (registered trade name) Gly canola" and the like; and a genetically-modified plant capable of expressing EPSPS having a glyphosate resistance mutation and originated from corn is commercially available by the trade name of "GlyTol (trade name)".

Plants tolerant to glufosinate herbicides: produced by introducing at least one of a gene (bar) for phosphinothricin N-acetyltransferase (PAT) that is a glufosinate metabolic enzyme originated from *Streptomyces hygroscopicus*, a gene (pat) for phosphinothricin N-acetyltransferase (PAT) that is a glufosinate metabolic enzyme originated from *Streptomyces viridochromogenes* and a synthetic pat gene (pat syn) originated from *Streptomyes viridochromogenes* strain Tu494. Examples of the major plant include Argentina canola (*Brassica napus*), chicory (*Cichorium intybus*), cotton (*Gossypium hirsutism* L.), corn (*Zea mays* L.), polish canola (*Brassica rapa*), rice (*Oryza sativa* L.), soybean (*Glycine max* L.) and sugar beet (*Beta vulgaris*). Some of the glufosinate-tolerant genetically-modified plants are commercially available. The glufosinate metabolic enzyme (bar) originated from *Streptomyces hygroscopicus* and the genetically-modified plant originated from (*Streptomyceses viridochromogenes*) are commercially available by the trade names including "LibertyLink (trade name)", "InVigor (trade name)" and "WideStrike (trade name)". Plants tolerant to oxynil-type herbicides (e.g., bromoxynil): a transgenic plant tolerant to an oxynil-type herbicide (e.g., bromoxynil), into which a gene (bxn) for nitrilase that is an oxynil-type herbicide (e.g., bromoxynil) metabolic enzyme originated from *Klebsiella pneumoniae* subsp. Ozaenae can be mentioned. Examples of the major plant include Argentine Canola (*Brassica napus*), cotton (*Gossypium hirsutism* L.) and tobacco (*Nicotiana tabacum* L.). These plants are commercially available by trade names including "Navigator (trade name) canola" and "BXN (trade name)". Plants tolerant to ALS herbicides: commercially available by the following trade names: carnation (*Dianthus caryophyllus*) "Moondust (trade name)", "Moonshadow (trade name)", "Moonshade (trade name)", "Moonlite (trade name)", "Moonaqua (trade name)", Moonvista (trade name)", "Moonique (trade name)", "Moonpearl (trade name)", "Moonberry (trade name)" and "Moonvelvet (trade name)" each having, introduced therein, an ALS herbicide-tolerant ALS gene (surB) originated from tobacco (*Nicotiana tabacum*) as a selection marker; lineseed (*Linum usitatissumum* L.) "CDC Triffid Flax" having, introduced therein, an ALS herbicide-tolerant ALS gene (als) originated from mouse-ear cress (*Arabidopsis thaliana*) as a selection marker; corn (*Zea mays* L.) "Optimum (trade name) GAT (trade name)" having tolerance to a sulfonylurea-type herbicide and an imidazolinone-type herbicide and having, introduced therein, an ALS herbicide-tolerant ALS gene (zm-hra) originated from corn as a selection marker; soybean "Cultivance" having tolerance to an imidazolinone-type herbicide and having, introduced therein, an ALS herbicide-tolerant ALS gene (csr1-2) originated from mouse-ear cress as a selection marker; and soybean "Treus (trade name)". "Plenish (trade name)" and "Optimum GAT (trade name)" having tolerance to a sulfonylurea-type herbicide and having, introduced therein, an ALS herbicide-tolerant ALS gene (gm-hra) originated from soybean (*Glycine max*) as a selection marker. Cotton having, introduced therein, an ALS herbicide-tolerant ALS gene (S4-HrA) originated from tobacco (*Nicotiana tabacum* cv. *xanthi*) can also be mentioned. Plants tolerant to HPPD herbicides: soybean having, simultaneously introduced therein, both of a mesotrione-tolerant HPPD gene (avhppd-03) originated from oat (*Avena sativa*) and a phosphinothricin N-acetyltransferase gene (pat) originated from *Streptomyces viridochromogenes* and having tolerance to mesotrione that is a glufosinate metabolic enzyme is commercially available by the trade name of "Herbicide-tolerant Soybean line".

Plants tolerant to 2,4-D: corn having, introduced therein, a gene (aad-1) for aryloxyalkanoate dioxygenase that is a 2,4-D metabolic enzyme and is originated from *Sphingobium herbicidovorans* is commercially available by the trade name of "Enlist (trade name) Maize". Soybean and cotton having, introduced therein, a gene (aad-12) for aryloxyalkanoate dioxygenase that is a 2,4-D metabolic enzyme and is originated from *Delftia acidovorans* is commercially available by the trade name of "Enlist (trade name) Soybean".

Plants tolerant to dicamba: soybean and cotton each having, introduced therein, a gene (dmo) for dicamba monooxygenase that is a dicamba metabolic enzyme and is originated from *Stenotrophomonas maltophilia* strain DI-6 can be mentioned. Soybean (*Glycine max* L.) into which a glyphosate-tolerant EPSPS gene (CP4 epsps) originated from *Agrobacterium tumefaciens* strain CP4 is also introduced simultaneously with the above-mentioned gene is commercially available by the trade name of "Genuity (registered trade name) Roundup Ready (trade name) 2 Xtend (trade name)".

Plants tolerant to PPO inhibitors: a plant imparted with protoporphyrinogen oxidase having reduced affinity for a PPO inhibitor by a transgenic technique, and a plant also imparted with cytochrome P450 monooxygenase capable of detoxifying or decomposing a PPO inhibitor can be mentioned. A plant imparted with both of the above-mentioned protoporphyrinogen oxidase and the above-mentioned cytochrome P450 monooxygenase can also be mentioned. These plants are disclosed in known documents including patent documents such as WO 2011085221, WO2012080975, WO 2014030090, WO 2015022640, WO 2015022636, WO 2015022639, WO 2015092706, WO 2016203377, WO 2017198859, WO 2018019860, WO 2018022777, WO 2017112589, WO 2017087672, WO 2017039969 and WO 2017023778 and a non-patent document (Pest Management Science, 61, 2005, 277-285).

Examples of the transgenic plant that is imparted with tolerance to a herbicide and is commercially available include: corn having tolerant to glyphosate, "Roundup Ready Corn", "Roundup Ready 2", "Agrisure GT", "Agrisure GT/CB/LL", "Agrisure GT/RW", "Agrisure 3000GT", "YieldGard VT Rootworm/RR2" and "YieldGard VT Triple": soybean having tolerance to glyphosate, "Roundup Ready Soybean" and "Optimum GAT"; cotton having tolerance to glyphosate, "Roundup Ready Cotton" and "Roundup Ready Flex"; canola having tolerance to glyphosate, "Roundup Ready Canola"; alfalfa having tolerance to glyphosate, "Roundup Ready Alfalfa"; rice having tolerance to glyphosate, "Roundup Ready Rice"; corn having tolerance to glufosinate, "Roundup Ready 2", "Liberty Link", "Herculex 1", "Herculex RW", "Herculex Xtra", "Agrisure GT/CB/LL", "Agrisure CB/LL/RW" and "Bt10"; cotton having tolerance to glufosinate, "FiberMax Liberty Link"; rice having tolerance to glufosinate, "Liberty Link Rice"; canola having tolerance to glufosinate, "in Vigor"; rice having tolerance to glufosinate, "Liberty Link Rice" (a produce by Bayer); cotton having tolerance to bromoxynil, "BXN"; and canola having tolerance to bromoxynil, "Navigator" and "Compass". Other plants which are modified with respect to the tolerance to herbicides are also widely known, such as: alfalfa, apple, barley, eucalyptus, lineseed, grape, lentil, rapeseed, pea, potato, rice, sugar beet, sunflower, tobacco, tomato, wheat grass and wheat each having tolerance to glyphosate (see, for example, U.S. Pat. Nos. 5,188,642, 4,940,835, 5,633,435, 5,804,425 and 5,627,061); bean, cotton, soybean, pea, potato, sunflower, tomato, tobacco, corn, sorghum and sugar cane each having tolerance to dicamba (see, for example, WO 2008051633, U.S. Pat. Nos. 7,105,724 and 5,670,454); soybean, sugar beet, potato, tomato and tobacco each having tolerance to glufosinate (see, for example, U.S. Pat. Nos. 6,376,754, 5,646, 024 and 5,561,236); cotton, peppers, apple, tomato, sunflower, tobacco, potato, corn, cucumber, wheat, soybean, sorghum and millets each having tolerance to 2,4-D (see, for example, U.S. Pat. Nos. 6,153,401, 6,100,446, WO 2005107437, U.S. Pat. Nos. 5,608,147 and 5,670,454); canola, corn, barnyard millet, barley, cotton, brown mustard, lettuce, lentil, melon, foxtail millet, oat, rapeseed, potato, rice, rye, sorghum, soybean, sugar beet, sunflower, tobacco, tomato and wheat each having tolerance to an ALS inhibitor (e.g., a sulfonylurea-type herbicide and an imidazolinone-type herbicide) (see, for example, U.S. Pat. No. 5,013,659, WO 2006060634, U.S. Pat. Nos. 4,761,373, 5,304,732, 6,211,438, 6,211,439 and 6,222,100) (particularly, rice having tolerance to an imidazolinone-type herbicide is known, and rice or the like having a specific mutation (e.g., S653N, S654K, A122T, S653(At)N, S654(At)K, A122(At)T) in ALS is known (see, for example, US 2003/0217381, WO 200520673)); and barley, sugar cane, rice, corn, tobacco, soybean, cotton, rapeseed, sugar beet, wheat and potato each having tolerance to an HPPD-inhibiting herbicide (e.g., an isoxazole-type herbicide such as isoxaflutole, a triketone-type herbicide such as sulcotrione and mesotrione, a pyrazole-type herbicide such as pyrazolynate, and diketonitrile that is a decomposition product of isoxaflutole (see, for example, WO 2004/055191, WO 199638567, WO 1997049816 and U.S. Pat. No. 6,791,014).

Examples of a plant that is imparted with tolerance to a herbicide by a traditional or genome-based breeding technique include: rice "Clearfield Rice", wheat "Clearfield Wheat", sunflower "Clearfield Sunflower", lentil "Clearfield lentils" and canola "Clearfield canola" (a product by manufactured by BASF) each having tolerance to an imidazolinone-type ALS-inhibition-type herbicide such as imazethapyr and imazamox; soybean "STS soybean" having tolerance to a sulfonyl-type ALS-inhibition-type herbicide such as thifensulfuron-methyl; sethoxydim-tolerant corn "SR corn" and "Poast Protected (registered trade name) corn" each having tolerance to an acetyl CoA carboxylase (abbreviated as "ACCase", hereinafter) inhibitor such as a trione oxime-type herbicide and an aryloxyphenoxypropionate-type herbicide; sunflower "ExpressSun (registered trade name)" having tolerance to a sulfonylurea-type herbicide such as tribenuron; rice "Rrovisia (trade name)" having tolerance to an acethyl CoA carboxylate inhibitor such as quizalofop; and canola "Triazinon Tolerant Canola" having tolerance to a photosystem II inhibitor.

An example of a plant that is imparted with tolerance to a herbicide by a genome editing technique is canola "SU Canola (registered trade name)" having tolerance to a sulfonylurea-type herbicide and produced by Rapid Trait Development System (RIDS (registered trade name)). RIDS (registered trade name) corresponds to an oligonucleotide-directed mutagenesis employed in a genome editing technique, and is a technique whereby it becomes possible to introduce a mutation into a plant through Gene Repair Oligonucleotide (GRON), i.e., a DNA-RNA chimeric oligonucleotide, without needing to cleave DNA in the plant. Examples of the plant also include: corn which is reduced in herbicide tolerance and a phytic acid content as the result of the deletion of endogenous gene IPK1 using a zinc finger nuclease (see, for example, Nature 459, 437-441 2009); and rice which is imparted with herbicide tolerance using CRISPR/Cas9 (see, for example, Rice, 7, 5 2014).

With respect to a plant imparted with tolerance to a herbicide by a new breeding technique, a case where tolerance to glyphosate is imparted to a non-transgenic soybean scion using Roundup Ready (registered trade name) soybean having tolerance to glyphosate as a rootstock (see Weed Technology 27:412-416 2013) can be mentioned as an example of the breeding technique employing grafting in which a trait of a GM rootstock is imparted to a scion.

Examples of the non-agricultural land to which the present method can be applied include a railroad, a plant premise, a land under a pipeline, a wayside, a park and a bank. The agricultural land is not particularly limited, as long as a plant such as a crop can be cultivated. Examples of the agricultural land include a upland field, a paddy field, a nursery tray, a nursery box and a nursery land.

In the present method, the present compound is generally used in the form of a formulation prepared by mixing with a carrier (e.g., a solid carrier and a liquid carrier) and then optionally adding an auxiliary agent for formulation (e.g., a surfactant). Preferred examples of the formulation type include a soluble liquid, soluble granules, an aqueous suspension concentrate, an oil-based liquid suspension concentrate, a wettable powder, water dispersible granules, granules, a water-based emulsion, an oil-based emulsion and an emulsifiable concentrate. More preferably, the formulation type is an aqueous suspension concentrate. A formulation containing the present compound as a sole active ingredient may be used singly, or the formulation may be used in the form of a mixture with a formulation containing another herbicide as an active ingredient. Alternatively, a formulation containing the present compound and another herbicide as active ingredient may be used. Alternatively, a formulation containing the present compound and another herbicide as active ingredients may be mixed with a formulation containing, as an active ingredient, a herbicide other than the herbicide contained in the above-mentioned formulation. The total content of the active ingredients (i.e., the total amount of the present compound and a herbicide other than the present compound) in the formulation is generally 0.01 to 90% by weight, preferably 1 to 80%% by weight.

Examples of the method of applying the present compound include a method in which the present compound is applied to the soil of a non-agricultural land or an agricultural land (a soil treatment) and a method in which the present compound is sprayed onto growing weeds (a foliar treatment). The spraying is generally carried out by mixing a formulation containing the present compound with water to prepare a spray dilution and then spraying the spray dilution using a spreader equipped with a nozzle. The amount of the dilution to be sprayed is not particularly limited, and is generally 50 to 1000 L/ha, preferably 100 to 500 L/ha, more preferably 140 to 300 L/ha.

The application rate of the present compound is 5 to 200 g per 10000 $m^2$, preferably 10 to 150 g per 10000 $m^2$, more preferably 20 to 120 g per 10000 $m^2$, still more preferably 40 to 100 g per 10000 $m^2$. In the application of the present compound, it is possible to mix an adjuvant with the present compound. The type of the adjuvant is not particularly limited. Examples of the adjuvant include: an oil-type adjuvant such as Agri-Dex and MSO; a nonionic adjuvant (an ester or ether of polyoxyethylene) such as Induce; an anionic adjuvant (a substituted sulfonate salt) such as Gramine S; a cationic adjuvant (polyoxyethyleneamine) such as Genamin T 200BM; and an organic silicon-based adjuvant such as Silwett L77. In addition, a drift-reducing agent such as Intact (polyethylene glycol) may be mixed.

The pH value and the hardness of the above-mentioned spray dilution are not particularly limited, and the pH value is generally within the range from 5 to 9, and the hardness is generally within the range from 0 to 500.

The time of day at which the present compound is to be applied is not particularly limited, and is generally within the range from 5 a.m. to 9 p.m. and the photon flux degree is generally 10 to 2500 micromoles/$m^2$/sec.

The spraying pressure to be employed for the application of the present compound is not particularly limited, and is generally 30 to 120 PSI, preferably 40 to 80 PSI.

In the present method, the type of the nozzle to be used in the application of the present compound may be a flat fan nozzle or a drift-reducing nozzle. Examples of the flat fan nozzle include products of Teejet 110 series and XR Teejet 110 series manufactured by Teejet. The volume median diameter of liquid droplets ejected through each of the nozzles is generally smaller than 430 microns at an ordinary spraying pressure, generally 30 to 120 PSI. A drift-reducing nozzle is a nozzle reduced in drift compared with a flat fan nozzle and is called as “an air induction nozzle” or “a pre-orifice nozzle”. The volume median diameter of liquid droplets ejected through the drift-reducing nozzle is generally 430 microns or larger.

An air induction nozzle has an air guide part between an inlet (a spray liquid introduction part) of the nozzle and an outlet (a spray liquid ejection part) of the nozzle so that liquid droplets filled with air can be formed upon the mixing the spray liquid with air. Examples of the air induction nozzle include: TDXL11003-D, TDXL11004-D1, TDXL11005-D1 and TDXL11006-D manufactured by Green Leaf Technology; TTI110025, TTI11003, TTI11004, TTI11005, TTI110061 and TTI110081 manufactured by Teejet; and ULD120-041, ULD120-051 and ULD120-061 manufactured by Pentair. A particularly desirable one is TTI11004.

A pre-orifice nozzle is a nozzle in which an inlet (a spray liquid introduction part) of the nozzle serves as a metering orifice, so that large liquid droplets can be formed by controlling the flow amount to be flown into the nozzle so as to decrease the pressure in the nozzle. When the pre-orifice nozzle is used, the pressure during the ejection of the spray liquid can be reduced by half compared with the pressure before the introduction of the spray liquid. Examples of the pre-orifice nozzle include: DR110-10, UR110-05, UR110-06, UR110-08 and UR110-10 manufactured by Wilger; and 1/4TTJ08 Turf Jet and 1/4TTJ04 Turf manufactured by Teejet.

In the case where the present method is applied in a cultivation area of a plant such as a crop, seeds of the plant are scattered over the cultivation area by a conventional method. In the present method, the present compound may be applied onto a cultivation area before seeding, or the present compound may be applied simultaneously with the seeding and/or after the seeding. Namely, the frequency of the application of the present compound is any one of once to three times. In the case where the frequency is once, the present compound is applied once before the seeding, or once simultaneously with the seeding, or once after the seeding. In the case where the frequency is twice, the present compound is applied twice not before the seeding, or twice not simultaneously with the seeding, or twice not after the seeding. In the case where the frequency is three times, the present compound is applied once before the seeding, once simultaneously with the seeding and once after the seeding.

In the case where the present compound is applied before the seeding, the present compound is applied generally 50 days before the seeding to immediately before the seeding, preferably 30 days before the seeding to immediately before the seeding, more preferably 20 days before the seeding to immediately before the seeding, still more preferably 10 days before the seeding to immediately before the seeding.

In the case where the present compound is applied after the seeding, the present compound is generally applied immediately after the seeding to before flowering. A more preferred timing of the application is a timing between immediately after the seeding to before budding of a plant and true leaf stage 1 to 6 of the plant.

The case where the present compound is applied simultaneously with the seeding is a case where a seeding machine is integrated with a sprayer.

In the case where the present method is applied in a cultivation area of a plant such as a crop, seeds of the plant may be treated with at least one compound selected from the group consisting of a specific insecticide compound, a specific nematicide compound, a specific fungicide compound and a specific plant growth regulator during the cultivation of the plant. Examples of the compound include a neonicotinoid-type compound, a diamide-type compound, a carbamate-type compound, an organic phosphorus-type compound, a biological nematicide compound or other insecticide or nematicide compound, an azole-type compound, a strobilurin-type compound, a metalaxyl-type compound, an SDHI compound, other fungicide compound, and a plant growth regulator compound.

Examples of the weeds which can be controlled by the present method include the following weeds, but are not limited thereto.

Urticaceae weeds: small nettle (*Urtica urens*)

Polygonaceae weeds: black bindweed (*Polygonum convolvulus*), pale persicaria (*Polygonum lapathifolium*), Pennsylvania smartweed (*Polygonum pensylvanicum*), redshank (*Polygonum persicaria*), bristly lady’s-thumb (*Polygonum longisetum*), knotgrass (*Polygonum aviculare*), equal-leaved knotgrass (*Polygonum arenastrum*), Japanese knotweed (*Polygonum cuspidatum*), Japanese dock (*Rumex japonicus*), curly dock (*Rumex crispus*), blunt-leaved dock (*Rumex obtusifolius*), common sorrel (*Rumex acetosa*)

Portulacaceae weeds: common purslane (*Portulaca oleracea*)

Caryophyllaceae weeds: common chickweed (*Stellaria media*), water chickweed (*Stellaria aquatica*), common mouse-ear (*Cerastium holosteoides*), sticky mouse-ear (*Cerastium glomeratum*), corn spurrey (*Spergula arvensis*), five-wound catchfly (*Silene gallica*)

Molluginaceae weeds: carpetweed (*Mollugo verticillata*)

Chenopodiaceae weeds: common lambsquarters (*Chenopodium album*), Indian goosefoot (*Chenopodium ambrosioides*), kochia (*Kochia scoparia*), spiny saltwort (*Salsola kali*), Orach (*Atriplex* spp.)

Amaranthaceae weeds: redroot pigweed (*Amaranthus retroflexus*), slender amaranth (*Amaranthus viridis*), livid amaranth (*Amaranthus lividus*), spiny amaranth (*Amaranthus spinosus*), smooth pigweed (*Amaranthus hybridus*), Palmer amaranth (*Amaranthus palmeri*), green pigweed (*Amaranthus patulus*), waterhemp (*Amaranthus tuberculatus=Amaranthus rudis=Amaranthus tamariscinus*), prostrate pigweed (*Amaranthus blitoides*), large-fruit amaranth (*Amaranthus deflexus*), mucronate amaranth (*Amaranthus quitensis*), alligator weed (*Alternanthera philoxeroides*), sessile alligator weed (*Alternanthera sessilis*), perrotleaf (*Alternanthera tenella*)

Papaveraceae weeds: common poppy (*Papaver rhoeas*), field poppy (*Papaver dubium*), Mexican prickle poppy (*Argemone mexicana*)

Brassicaceae weeds: wild radish (*Raphanus raphanistrum*), radish (*Raphanus sativus*), wild mustard (*Sinapis arvensis*), shepherd's purse (*Capsella bursa-pastoris*), white mustard (*Brassica juncea*), oilseed rape (*Brassica napus*), pinnate tansy mustard (*Descurainia pinnata*), marsh yellowcress (*Rorippa islandica*), yellow fieldcress (*Rorippa sylvestris*), field pennycress (*Thlaspi arvense*), turnip weed (*Myagrum rugosum*), Virginia pepperweed (*Lepidium virginicum*), slender wartcress (*Coronopus didymus*)

Capparaceae weeds: African cabbage (*Cleome affinis*)

Fabaceae weeds: Indian joint vetch (*Aeschynomene indica*), zigzag joint vetch (*Aeschynomene rudis*), hemp sesbania (*Sesbania exaltata*), sickle pod (*Cassia obtusifolia*), coffee senna (*Cassia occidentalis*), Florida beggar weed (*Desmodium tortuosum*), wild groundnut (*Desmodium adscendens*), Illinois tick trefoil (*Desmodium illinoense*), white clover (*Trifolium repens*), kudzu (*Pueraria lobata*), narrowleaf vetch (*Vicia angustifolia*), hairy indigo (*Indigofera hirsuta*), *Indigofera truxillensis*, common cowpea (*Vigna sinensis*)

Oxalidaceae weeds: creeping wood sorrel (*Oxalis corniculata*), European wood sorrel (*Oxalis stricta*), purple shamrock (*Oxalis oxyptera*)

Geraniaceae weeds: Carolina geranium (*Geranium carolinense*), common storksbill (*Erodium cicutarium*)

Euphorbiaceae weeds: sun spurge (*Euphorbia helioscopia*), annual spurge (*Euphorbia maculata*), prostrate spurge (*Euphorbia humistrata*), Hungarian spurge (*Euphorbia esula*), wild poinsettia (*Euphorbia heterophylla*), hyssopleaf sandmat (*Euphorbia brasiliensis*), Asian copperleaf (*Acalypha australis*), tropic croton (*Croton glandulosus*), lobed croton (*Croton lobatus*), long-stalked phyllanthus (*Phyllanthus corcovadensis*), castor bean (*Ricinus communis*)

Malvaceae weeds: velvetleaf (*Abutilon theophrasti*), arrow-leaf sida (*Sida rhombifolia*), heart-leaf sida (*Sida cordifolia*), prickly sida (*Sida spinosa*), *Sida glaziovii*, *Sida santaremnensis*, bladder weed (*Hibiscus trionum*), spurred anoda (*Anoda cristata*), spine-seeded false-mallow (*Malvastrum coromandelianum*)

Onagraceae weeds: *Ludwigia epilobioides*, long-fruited primrose willow (*Ludwigia octovalvis*), winged water primrose (*Ludwigia decurrens*), common evening-primrose (*Oenothera biennis*), cutleaf evening-primrose (*Oenothera laciniata*)

Sterculiaceae weeds: Florida waltheria (*Waltheria indica*)

Violaceae weeds: field violet; *Viola arvensis*, wild violet; *Viola tricolor*

Cucurbitaceae weeds: bur cucumber (*Sicyos angulatus*), wild cucumber (*Echinocystis lobata*), bitter balsam apple (*Momordica charantia*)

Lythraceae weeds: *Ammannia multiflora*, eared redstem (*Ammannia auriculata*), scarlet toothcup (*Ammannia coccinea*), purple loosestrife (*Lythrum salicaria*), Indian toothcup (*Rotala indica*)

Elatinaceae weeds: three-stamen waterwort (*Elatine triandra*), California waterwort (*Elatine californica*)

Apiaceae weeds: Chinese celery (*Oenanthe javanica*), wild carrot (*Daucus carota*), carrot fern (*Conium maculatum*)

Araliaceae weeds: lawn pennywort (*Hydrocotyle sibthorpioides*), floating pennywort (*Hydrocotyle ranunculoides*)

Ceratophyllaceae weeds: common hornwort (*Ceratophyllum demersum*)

Cabombaceae weeds: Carolina fanwort (*Cabomba caroliniana*)

Haloragaceae weeds: Brazilian water milfoil (*Myriophyllum aquaticum*), whorled water milfoil (*Myriophyllum verticillatum*), water milfoils (*Myriophyllum spicatum, Myriophyllum heterophyllum*, etc.)

Sapindaceae weeds: heartseed (*Cardiospermum halicacabum*)

Primulaceae weeds: scarlet pimpernel (*Anagallis arvensis*)

Asclepiadaceae weeds: common milkweed (*Asclepias syriaca*), honeyvine milkweed (*Ampelamus albidus*)

Rubiaceae weeds: catchweed bedstraw (*Galium aparine*), *Galium spurium* var. *echinospermon*, broadleaf buttonweed (*Spermacoce latifolia*), Brazil calla lily (*Richardia brasiliensis*), broadleaf buttonweed (*Borreria alata*)

Convolvulaceae weeds: Japanese morning glory (*Ipomoea nil*), ivy-leaf morning glory (*Ipomoea hederacea*), tall morning glory (*Ipomoea purpurea*), entire-leaf morning glory (*Ipomoea hederacea* var. *integriuscula*), pitted morning glory (*Ipomoea lacunosa*), three-lobe morning glory (*Ipomoea triloba*), blue morning glory (*Ipomoea acuminata*), scarlet morning glory (*Ipomoea hederifolia*), red morning glory (*Ipomoea coccinea*), cypress-vine morning glory (*Ipomoea quamoclit*), *Ipomoea grandifolia*, *Ipomoea aristolochiaefolia*, Cairo morning glory (*Ipomoea cairica*), field bindweed (*Convolvulus arvensis*), Japanese false bindweed (*Calystegia hederacea*), Japanese bindweed (*Calystegia japonica*), ivy woodrose (*Merremia hederacea*), hairy woodrose (*Merremia aegyptia*), roadside woodrose (*Merremia cissoides*), small-flower morning glory (*Jacquemontia tamnifolia*)

Boraginaceae weeds: field forget-me-not (*Myosotis arvensis*)

Lamiaceae weeds: purple deadnettle (*Lamium purpureum*), common henbit (*Lamium amplexicaule*), lion's ear (*Leonotis nepetaefolia*), wild spikenard (*Hyptis suaveolens*), *Hyptis lophanta*, Siberian motherwort (*Leonurus sibiricus*), field-nettle betony (*Stachys arvensis*)

Solanaceae weeds: jimsonweed (*Datura stramonium*), black nightshade (*Solanum nigrum*), American black nightshade (*Solanum americanum*), eastern black nightshade (*Solanum ptycanthum*), hairy nightshade (*Solanum sarrachoides*), buffalo bur (*Solanum rostratum*), soda-apple nightshade (*Solanum aculeatissimum*), sticky nightshade (*Solanum sisymbriifolium*), horse nettle (*Solanum carolinense*), cutleaf groundcherry (*Physalis angulata*), smooth groundcherry (*Physalis subglabrata*), apple of Peru (*Nicandra physalodes*)

Scrophulariaceae weeds: ivyleaf speedwell (*Veronica hederaefolia*), common speedwell (*Veronica persica*), corn speedwell (*Veronica arvensis*), common false pimpernel (*Lindernia procumbens*), false pimpernel (*Lindernia dubia*), *Lindernia angustifolia*, round-leaf water hyssop (*Bacopa rotundifolia*), dopatrium (*Dopatrium junceum*), *Gratiola japonica*

Plantaginaceae weeds: Asiatic plantain (*Plantago asiatica*), narrow-leaved plantain (*Plantago lanceolata*), broadleaf plantain (*Plantago major*), marsh water starwort (*Callitriche palustris*)

Asteraceae weeds: common cocklebur (*Xanthium pensylvanicum*), large cocklebur (*Xanthium occidentale*), Canada cocklebur (*Xanthium italicum*), common sunflower (*Helianthus annuus*), wild chamomile (*Matricaria chamomilla*), scentless chamomile (*Matricaria perforata*), corn marigold (*Chrysanthemum segetum*), rayless mayweed (*Matricaria matricarioides*), Japanese mugwort (*Artemisia princeps*), common mugwort (*Artemisia vulgaris*), Chinese mugwort (*Artemisia verlotorum*), tall goldenrod (*Solidago altissima*), common dandelion (*Taraxacum officinale*), hairy galinsoga (*Galinsoga ciliata*), small-flower galinsoga (*Galinsoga parviflora*), common groundsel (*Senecio vulgaris*), flower-of-souls (*Senecio brasiliensis*), *Senecio grisebachii*, fleabane (*Conyza bonariensis*), Guernsey fleabane (*Conyza sumatrensis*), marestail (*Conyza canadensis*), common ragweed (*Ambrosia artemisiifolia*), giant ragweed (*Ambrosia trifida*), three-cleft bur-marigold (*Bidens tripartita*), hairy beggarticks (*Bidens pilosa*), common beggarticks (*Bidens frondosa*), greater beggarticks (*Bidens subalternans*), Canada thistle (*Cirsium arvense*), black thistle (*Cirsium vulgare*), blessed milkthistle (*Silybum marianum*), musk thistle (*Carduus nutans*), prickly lettuce (*Lactuca serriola*), annual sowthistle (*Sonchus oleraceus*), spiny sowthistle (*Sonchus asper*), beach creeping oxeye (*Wedelia glauca*), perfoliate blackfoot (*Melampodium perfoliatum*), red tasselflower (*Emilia sonchifolia*), wild marigold (*Tagetes minuta*), para cress (*Blainvillea latifolia*), coat buttons (*Tridax procumbens*), Bolivian coriander (*Porophyllum ruderale*), Paraguay starbur (*Acanthospermum australe*), bristly starbur (*Acanthospermum hispidum*), balloon vine (*Cardiospermum halicacabum*), tropic ageratum (*Ageratum conyzoides*), common boneset (*Eupatorium perfoliatum*), fireweed (*Erechtites hieracifolia*), American cudweed (*Gamochaeta spicata*), linear-leaf cudweed (*Gnaphalium spicatum*), *Jaegeria hirta*, ragweed parthenium (*Parthenium hysterophores*), small yellow crownbeard (*Siegesbeckia orientalis*), lawn burweed (*Soliva sessilis*), white eclipta (*Eclipta prostrata*), American false daisy (*Eclipta alba*), spreading sneezeweed (*Centipeda minima*)

Alismataceae weeds: dwarf arrowhead (*Sagittaria pygmaea*), threeleaf arrowhead (*Sagittaria trifolia*), arrowhead (*Sagittaria sagittifolia*), giant arrowhead (*Sagittaria montevidensis*), *Sagittaria aginashi*, channelled water plantain (*Alisma canaliculatum*), common water plantain (*Alisma plantago-aquatica*)

Limnocharitaceae weeds: Sawah flowering rush (*Limnocharis flava*)

Hydrocharitaceae weeds: American frogbit (*Limnobium spongia*), Florida elodea (*Hydrilla verticillata*), common water nymph (*Najas guadalupensis*)

Araceae weeds: Nile cabbage (*Pistia stratiotes*) Lemnaceae weeds: three-nerved duckweed (*Lemna aoukikusa, Lemna paucicostata, Lemna aequinoctialis*), common duckmeat (*Spirodela polyrhiza*), *Wolffia* spp.

Potamogetonaceae weeds: roundleaf pondweed (*Potamogeton distinctus*), pondweeds (*Potamogeton crispus, Potamogeton illinoensis, Stuckenia pectinata*, etc.)

Liliaceae weeds: wild onion (*Allium canadense*), wild garlic (*Allium vineale*), Chinese garlic (*Allium macrostemon*)

Pontederiaceae weeds: common water hyacinth (*Eichhornia crassipes*), blue mud plantain (*Heteranthera limosa*), *Monochoria korsakowii*, heartshape false pickerelweed (*Monochoria vaginalis*)

Commelinaceae weeds: common dayflower (*Commelina communis*), tropical spiderwort (*Commelina benghalensis*), erect dayflower (*Commelina erecta*), Asian spiderwort (*Murdannia keisak*)

Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavonis*), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shattercane (grain sorghum; *Sorghum vulgare*), quackgrass (*Agropyron repens*), Italian ryegrass (*Lolium multiflorum*), perennial ryegrass (*Lolium perenne*), rigid ryegrass (rigid ryegrass; *Lolium rigidum*), rescue brome (*Bromus catharticus*), downy brome (*Bromus tectorum*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall panicum (*Panicum dichotomiflorum*), Texas panicum (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery pennisetum (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand paspalum (*Paspalum maritimum*), mercergrass (*Paspalum distichum*), kikuyugrass (*Pennisetum clandestinum*), West Indies pennisetum (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), *Leersia sayanuka*, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocksfoot (*Dactylis glomerata*), centipede grass (*Eremochloa ophi-* uroides), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), Japanese lawngrass (*Zoysia japonica*)

Cyperaceae weeds: Asian flatsedge (*Cyperus microiria*), rice flatsedge (*Cyperus iria*), hedgehog cyperus (*Cyperus compressus*), small-flowered nutsedge (*Cyperus difformis*), lax-flat sedge (*Cyperus flaccidus*), *Cyperus globosus, Cyperus nipponicus*, fragrant flatsedge (*Cyperus odoratus*), mountain nutsedge (*Cyperus serotinus*), purple nutsedge (*Cyperus rotundus*), yellow nutsedge (*Cyperus esculentus*), pasture spike sedge (*Kyllinga gracillima*), green *kyllinga* (*Kyllinga brevifolia*), grasslike *fimbristylis* (*Fimbristylis miliacea*), annual fringerush (*Fimbristylis dichotoma*), slender spikerush (*Eleocharis acicularis*), *Eleocharis kurogu-wai*, Japanese bulrush (*Schoenoplectiella hotarui*), hardstem bulrush (*Schoenoplectiella juncoides*), *Schoenoplectiella wallichii*, rough-seed bulrush (*Schoenoplectiella mucronatus*), *Schoenoplectiella triangulatus, Schoenoplectiella nipponicus*, triangular club-rush (*Schoenoplectiella triqueter*), *Bolboschoenus koshevnikovii*, river bulrush (*Bolboschoenus fluviatilis*)

Equisetaceae weeds: field horsetail (*Equisetum arvense*), marsh horsetail (*Equisetum palustre*)

Salviniaceae weeds: floating fern (*Salvinia natans*)

Azollaceae weeds: Japanese mosquitofern (*Azolla japonica*), feathered mosquito fern (*Azolla pinnata*)

Marsileaceae weeds: clover fern (*Marsilea quadrifolia*)

Other: Filamentous algae (Pithophora, Cladophora), Bryophyta, Marchantiophyta, Anthocerotophyta, Cyanobacteria, Pteridophyta, sucker of perennial crop (pome fruits, stone fruits, berry fruits, nuts, citrus fruits, hops, grapes, etc.)

The resistance factor of a glyphosate-resistant weed which can be controlled by the present method may rely on a mutation at a target site (a target-site mutation) or a factor that is not a target-site mutation (i.e., a nontarget-site mutation). The non target-site mutation includes the enhancement of metabolism, malabsorption, transportation deficiency, out-of-system extrution and the like. As a factor of the enhancement of metabolism, the increase in the activity of a metabolic enzyme such as cytochrome P450 monooxygenase (CYP), arylacylamidase (AAA), esterase and glutathione S transferase (GST) can be mentioned. As the out-of-system extrution, the transportation to a vacuole by an ABC transporter can be mentioned.

An example of the target-site mutation is a mutation in which the substitution of any one amino acid residue or multiple amino acid residues selected from the below-mentioned amino acid residues occurs in EPSPS gene. Thr102Ile, Pro106Ser, Pro106Ala, and Pro106Leu. Particularly, a mutation in which both of Thr102Ile and Pro106Ser are substituted can be mentioned. Glyphosate-resistant goosegrass, Italian ryegrass, rigid ryegrass, perennial ryegrass and the like each having the target-site mutation can be controlled effectively. Similarly, an example of the case of glyphosate resistance due to a target-site is a case where the number of copies of EPSPS gene is increased (PNAS, 2018 115 (13) 3332-3337). Glyphosate-resistant *Amaranthus palmeri*, waterhemp, *kochia* and the like in each of which the number of copies of EPSPS gene is increased can be controlled effectively. Glyphosate-resistant marestail, Guernsey fleabane, fleabane, and like in which an ABC transporter is involved can be controlled effectively.

In the case where a crop B that is different from a crop A naturally grows accidently in a cultivation area of the crop A, the crop that naturally grows is called as a "volunteer crop B", which is also one of weeds to be controlled. Volunteer glyphosate-tolerant soybean and volunteer glyphosate-tolerant cotton can also be controlled effectively as some of the glyphosate-resistant weeds by the present method. Examples of the case where the present method is employed in a cultivation area of a crop, the crop A is a glyphosate-tolerant plant and the volunteer crop B is intended to be controlled include a case where it is intended to control the crop B that naturally grows in the cultivation area of the crop A before the scattering of seeds of the crop, a case where the crop B occurs locally and simultaneously with the crop A but the method is applied only to the crop B, and a case where the crop B occurs locally and simultaneously with the crop A but only the crop A is trifludimoxazin-tolerant.

The glyphosate-resistant weed that can be controlled by the present method may also acquire a trait of the resistance to another herbicide by a target-site mutation or a non target-site mutation. Specific examples of the weed will be mentioned below by herbicide groups.

Resistance to ALS-Inhibition-Type Herbicides:

Those weeds each of which has a mutation capable of causing the substitution of one amino acid residue or multiple amino acid residues selected from the below-mentioned amino acid residues in ALS gene as a target-site mutation can be mentioned. Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Asp376Asn, Arg377His, Trp574Leu, Trp574Gly, Trp574Met, Ser653Thr, Ser653Thr, Ser653Asn, Ser635Ile, Gly654Glu and Gly645Asp. ALS inhibitor-resistant redroot amaranth, green amaranth, *Amaranthus palmeri*, waterhemp, *kochia* and the like each having the target-site mutation can be controlled effectively, even if these weeds are glyphosate-resistant. Weeds each of which has such a non target-site mutation that CYP or GST is involved to make the weed resistant to an ALS inhibitor can also be controlled effectively, even if the weeds are glyphosate-resistant.

Resistance to ACCase Inhibitors:

Those weeds each of which has a mutation capable of causing the substitution of one amino acid residue or multiple amino acid residues in ACCase gene as a target-site mutation can be mentioned. Ile1781Leu, Ile1781Val, Ile1781Thr, Trp1999Cys, Trp1999Leu, Ala2004Val, Trp2027Cys, Ile2041Asn, Ile2041Val, Asp2078Gly and Cys2088Arg. ACCase-resistant weeds each having one of the above-mentioned target-site mutations can be controlled effectively, even if the weeds are glyphosate-resistant. Weeds each of which becomes resistant to an ALS inhibitor as the result of the involvement of CYP or GST as a non target-site mutation can also be controlled effectively, even if the weeds are glyphosate-resistant.

Resistance to PPO Inhibitors:

A weed which has, as the target-site mutation, a mutation that can cause the substitution of one amino acid residue or multiple amino acid residues selected from the below-mentioned amino acid residues in PPO gene is known or is assumed as a weed having a carfentrazone-ethyl-, fomesafen- or lactofen-resistance mutation. Arg128Leu, Arg128Met, Arg128Gly, Arg128His, Arg128Ala, Arg128Cys, Arg128Glu, Arg128Ile, Arg128Lys, Arg128Asn, Arg128Gln, Arg128Ser, Arg128Thr, Arg128Val, Arg128Tyr, Gly210 deficit, Ala210 deficit, Gly210Thr, Ala210Thr, G211 deficit, Gly114Glu, Ser149Ile and Gly399Ala (each amino acid number is standardized in terms of the number in the sequence for PPO2 in *Amaranthus palmeri*. In general, PPO in a weed includes PPO1 and PPO2. The above-mentioned mutation may occur in either one or both of PPO1 and PPO2. It is preferred that the mutation occurs in PPO2. For example, "Arg128Met" means that a mutation occurs in an amino acid residue located at position-128. Arg128Leu is also known as Arg98Leu in PPO2 in hog weed (Weed Science 60, 335-344); Arg128Met is known in PPO2 in *Amaranthus palmeri* (Pest Management Science 73, 1159-1563); Arg128Gly is known in PPO2 in *Amaranthus palmeri* (Pest Management Science 73, 1159-1563) and PPO2 in waterhemp (Pest Management Science, doi: 10.1002/ps.5445); Arg128Ile and Arg128Lys are known in PPO2 in waterhemp (Pest Management Science, doi: 10.1002/ps.5445); Arg128His is known as Arg132His in PPO2 in Swiss ryegrass (WSSA annual meeting, 2018); Gly114Glu, Ser149Ile and Gly399Ala are known in PPO2 in *Amaranthus palmeri* (Frontiers in Plant Science 10, Article 568); and Ala210Thr is known as Ala212Thr in PPO1 in Indian goosegrass (WSSA annual meeting, 2019). PPO inhibitor-resistant weeds each having one of the above-mentioned target-site mutations can be controlled effectively, even if the weeds are glyphosate-resistant. However, the PPO inhibitor-resistant weed is not limited to these weeds. Namely, other PPO inhibitor-resistant weeds having the above-mentioned amino acid mutations can also be controlled, even if the weeds are glyphosate-resistant. *Amaranthus palmeri* having a mutation of Arg128Leu, Arg128Met, Arg128Gly, Arg128His, Arg128Ala, Arg128Cys, Arg128Glu, Arg128Ile, Arg128Lys, Arg128Asn, Arg128Gln, Arg128Ser, Arg128Thr, Arg128Val, Arg128Tyr, Gly210 deficit, Ala210 deficit, Gly210Thr, Ala210Thr, G211 deficit, Gly114Glu, Ser149Ile or Gly399Ala in PPO1 or PPO2, as well as, for example, waterhemp having the same mutation, hog weed having the same mutation and wild poinsettia having the same mutation can be controlled effectively, even if these weeds are glyphosate-resistant. As the waterhemp and *Amaranthus palmeri* which become resistant to a PPO inhibitor as the result of the involvement of CYP or GST as a non target-site mutation, waterhemp and the like which become resistant to carfentrazone-ethyl are known (PLOS ONE, doi: 10.1371/journal.pone.0215431). These weeds can also be controlled effectively, even if the weeds are glyphosate-resistant.

Resistance to Auxin-Type Herbicides:

As the target-site mutation, a mutation which can cause Gly-Asn in a degron region in AUX/IAA gene can be mentioned. *kochia*, *Amaranthus palmeri* and waterhemp each having this mutation can be controlled effectively, even if these weeds are glyphosate-resistant. As the non target-site mutation, dicamba-resistant green amaranth and 2,4-D-resistant waterhemp to which the involvement of CYP is suggested are known. These weeds can be controlled effectively, even if these weeds are glyphosate-resistant. These weeds can also be controlled when GST is involved.

Resistance to HPPD Inhibitors:

Waterhemp, *Amaranthus palmeri* and the like each of which becomes resistant to an HPPD inhibitor as the result of the involvement of CYP or GST as the non target-site mutation can be controlled effectively, even if the weeds are glyphosate-resistant.

Resistance to photosystem II inhibitors: Those weeds each of which has, as the target-site mutation, a mutation capable of causing the substitution of one amino acid residue or multiple amino acid residues selected from the below-mentioned amino acid residues in psbA gene can be mentioned. Val219Ile, Ser264Gly, Ser264Ala and Phe274Val. Photosystem II inhibitor-resistant *Amaranthus palmeri* and waterhemp each having this target-site mutation can be controlled effectively, even if these weeds are glyphosate-resistant. *Amaranthus palmeri*, waterhemp and the like each of which becomes resistant to a photosystem II inhibitor as the result of the involvement of CYP, GST or AAA as the non target-site mutation can be controlled effectively, even if these weeds are glyphosate-resistant.

Resistance to glutamate synthase inhibitors: Those weeds each of which has, as the target-site mutation, a mutation capable of causing the amino acid substitution of Asp171Asn in a glutamate synthase gene can be mentioned. Glutamate synthase inhibitor-resistant *Amaranthus palmeri*, waterhemp and the like each having this target-site mutation can be controlled effectively, even if these weeds are glyphosate-resistant. *Amaranthus palmeri*, waterhemp and the like each of which becomes resistant to glufosinate as the result of the involvement of CYP or GST as the non target-site mutation can be controlled effectively, even if the weeds are glyphosate-resistant.

Glyphosate-resistant weeds each having a "combination (stack)" of at least two groups selected from the above-mentioned groups (arbitrarily selected two groups, arbitrarily selected three groups, arbitrarily selected four groups, arbitrarily selected five groups, arbitrarily selected six groups, or arbitrarily selected seven groups) can also be controlled effectively. For example, waterhemp having resistance to all of a photosystem II inhibitor, a HPPD inhibitor, 2,4-D, a PPO inhibitor, an ALS inhibitor and glyphosate is known. This weed can also be controlled effectively. The stack may be a combination of target-site mutations or a combination of non target-site mutations, or a combination of a target-site mutation and a non target-site mutation.

In the present method, the present compound can be used in combination with at least one another herbicide, plant growth regulator or safener. In this regard, the wording "use in combination" includes, within its scope, tank mixing, premixing and a sequential treatment. In the case of the sequential treatment, the order of treating each component is not particularly limited.

Examples of the herbicide, plant growth regulator and safener which can be used in combination with the present compound are as follows.

Herbicides: 2,3,6-trichlorobenzoic acid, 2,3,6-TBA-dimethylammonium, 2,3,6-TBA-lithium, 2,3,6-TBA-potassium, 2,3,6-TBA-sodium, 2,4-D choline salt, 2,4-D N,N-bis(3-aminopropyl)methylamine salt, 2,4-D-2-butoxypropyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D-isobutyl, 2,4-D-isooctyl, 2,4-D-isopropyl, 2,4-D-isopropylammonium, 2,4-D-lithium, 2,4-D-mepty, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris(2-hydroxypropyl) ammonium, 2,4-D-trolamine, 2,4-DB choline salt, 2,4-DB N,N-bis(3-aminopropyl)methylamine salt, 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, 2-amino-3-chloronaphthalene-1,4-dione, alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, aminopyralid-tris(2-hydroxypropyl)ammonium, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafos-bialaphos, bicyclopyrone, bifenox, bispyribac, bispyribac-sodium, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium, clopyralid-tris(2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dicamba, dicamba choline salt, dicamba N,N-bis(3-aminopropyl)methylamine salt (dicamba BAPMA salt), dicamba-trolamine, dicamba-diglycolamine, dicamba-dimethylammonium, dicamba-diolamine, dicamba-isopropylammonium, dicamba-methyl, dicamba-olamine, dicamba-potassium, dicamba-sodium, dichlobenil, dichlorprop, dichlorprop choline salt, dichlorprop N,N-bis(3-aminopropyl)methylamine salt, dichlorprop-2-ethylhexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P N,N-bis(3-aminopropyl)methylamine salt, dichlorprop-P-2-ethylhexyl, dichlorprop-P-dimethylammonium, dichlorprop-potassium, dichlorprop-sodium, diclofop, diclofop-methyl, diclosulam, difenoxuron, difenzoquat, diflufenican, diflufenzopyr, diflufenzopyr-sodium, dimefuron, dimepiperate, dimethachlor, dimethametryn, dimethenamid, dimethenamid-P, dimepiperate, dinitramine, dinoseb, dinoterb, diphenamid, diquat, diquat-dibromide, disodium methylarsonate, dithiopyr, diuron, 2-methyl-4,6-dinitrophenol, esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumetsulam, flumiclorac, flumiclorac-pentyl, flumioxazin, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P, glufosinate-P-ammonium, glufosinate-P-sodium, glyphosate, glyphosate choline salt, glyphosate guanidine derivative salts, glyphosate isopropylamine salt, glyphosate N,N-bis(3-aminopropyl)methylamine salt, glyphosate-ammonium, glyphosate-diammonium, glyphosate-potassium, glyphosate-sodium, glyphosate-trimethylsulfonium, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, 2-(4-chloro-2-methylphenoxy)acetic acid, MCPA choline salt, MCPA N,N-bis(3-aminopropyl)methylamine salt, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, 4-(4-chloro-2-methylphenoxy)butanoic acid, MCPB choline salt, MCPB N,N-bis(3-aminopropyl)methylamine salt, MCPB-ethyl, MCPB-methyl, MCPB-sodium, mecoprop, mecoprop choline salt, mecoprop N,N-bis(3-aminopropyl)methylamine salt, mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-potassium, mefenacet, mesosulfuron, mesosulfuron-methyl, mesotrione, metam, metamifop, metamitron, metazachlor, metazosulfuron, methabenzthiazuron, methiozolin, methyldaymuron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, S-ethyl N,N-dipropylcarbamothioate, siduron, simazine, simetryn, S-metolachlor, sodium hydrogen methylarsonate, sulcotrione, sulfentrazone, sulfometuron, sulfometuron-methyl, sulfosulfuron, swep, 2,2,2-trichloroacetic acid, tebutam, tebuthiuron, tefuryltrione, tembotrione, tepraloxydim, terbacil, terbumeton, terbuthylazine, terbutryn, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifluralin, triflusulfuron, triflusulfuron-methyl, tritosulfuron, vernolate, Ethyl [(3-{2-chloro-4-fluoro-5-[3-methyl-4-(trifluoromethyl)-2,6-dioxo-1,2,3,6-tetrahydropyrimidin-1-yl]phenoxy}pyridin-2-yl)oxy] acetate (CAS registry number: 353292-31-6), 2-methyl-N-(5-methyl-1,3,4-oxadiazol-2-yl)-3-(methylsulfonyl)-4-(trifluoromethyl)benzamide (CAS registry number: 1400904-50-8), 2-chloro-N-(1-methyl-1H-tetrazol-5-yl)-3-

(methylthio)-4-(trifluoromethyl)benzamide (CAS registry number: 1361139-71-0), and 4-(4-fluorophenyl)-6-[(2-hydroxy-6-oxo-1-cyclohexen-1-yl)carbonyl]-2-methyl-1,2,4-triazine-3,5(2H,4H)-dione (CAS registry number: 1353870-34-4), 2-[(2,4-dichlorophenyl)methyl]-4,4-dimethylisooxazolidin-3-one (CAS registry number: 81777-95-9), and (3S,4S)—N-(2-fluorophenyl)-1-methyl-2-oxo-4-[3-(trifluoromethyl)phenyl]-3-pyrrolidinecarboxamide (CAS registry number: 2053901-33-8).

Safeners: allidochlor, benoxacor, cloquintocet, cloquintocet-mexyl, cyometrinil, cyprosulfamide, dichlormid, dicyclonone, dimepiperate, disulfoton, daiymuron, fenchlorazole, fenchlorazole-ethyl, fenclorim, flurazole, furilazole, fluxofenim, hexim, isoxadifen, isoxadifen-ethyl, mecoprop, mefenpyr, mefenpyr-ethyl, mefenpyr-diethyl, mephenate, metcamifen, oxabetrinil, 1,8-naphthalic anhydride, 1,8-octamethylene diamine, AD-67 (4-(dichloroacetyl)-1-oxa-4-azaspiro [4.5] decane, MCPA (2-(4-chloro-2-methylphenoxy)acetic acid), CL-304415 (4-carboxy-3,4-dihydro-2H-1-benzopyran-4-acetic acid), CSB (1-bromo-4-[(chloromethyl)sulfonyl]benzene), DKA-24 (2,2-dichloro-N-[2-oxo-2-(2-propenylamino)ethyl]-N-(2-propenyl) acetamide), MG191 (2-(dichloromethyl)-2-methyl-1,3-dioxolane), MG-838 (2-propenyl 1-oxa-4-azaspiro[4.5] decane-4-carbodithioate), PPG-1292 (2,2-dichloro-N-(1,3-dioxan-2-ylmethyl)-N-(2-propenyl)acetamide), R-28725 (3-(dichloroacetyl)-2,2-dimethyl-1,3-oxazolidine), R-29148 (3-(dichloroacetyl)-2,2,5-trimethyl-1,3-oxazolidine), TI-35 (1-(dichloroacetyl) azepane).

Plant growth regulators: hymexazol, paclobutrazol, uniconazole, uniconazole-P, inabenfide, prohexadione-calcium, 1-methylcyclopropene, trinexapac and trinexapac-ethyl.

In the present method, particularly preferred examples of the herbicide that can be used in combination with the present compound include saflufenacil, glyphosate potassium salt, glyphosate guanidine salt, glyphosate dimethylamine salt, glyphosate monoethanolamine salt, glyphosate isopropylammonium salt, dimethenamid-P, imazethapyr ammonium salt, pyroxasulfone, mesotrione, isoxaflutole, dicamba BAPMA salt and glufosinate ammonium salt.

In the present method, particularly preferred examples of the safener that can be used in combination with the present compound include cyprosulfamide, benoxacor, dichlormid, furilazole and isoxadifen-ethyl.

In the case where the herbicide and/or the safener is used in combination with the present compound, the ratio of the amount (part by weight) of the herbicide and/or the safener is generally 0.001 to 100 times, preferably 0.01 to times, more preferably 0.1 to 5, the amount (part by weight) of the present compound. The ratio of the herbicide and/or the safener is still more preferably 0.2 time, 0.4 time, 0.6 time, 0.8 time, 1 time, 1.5 times, 2 times, 2.5 times, 3 times, or 4 times. The above-mentioned ratio may be an approximate value. The term "approximate" means the acceptance of plus or minus 10%. For example, the wording "approximately 2 times" refers to 1.8 to 2.2 times.

In the cultivation of a crop in the present invention, a plant-nutritional management in a common crop cultivation can be made. A fertilization system may be one based on Precision Agriculture, or may be a conventional homogeneous one. Alternatively, a nitrogen-fixing bacterium or a mycorrhizal fungus may be inoculated by a seed treatment.

EXAMPLES

Hereinbelow, the present invention will be described in more detail by way of examples. However, the present invention is not limited by these examples.

At first, criteria for the evaluation of the herbicidal effect and the harmful effect against crops shown in the below-mentioned examples will be described.

[Herbicidal Effect and Harmful Effect Against Crops]

The herbicidal effect was rated within the range from to 100, wherein "0" was a rating where the state of emergence or growth of a sample weed during a test had no difference or little difference compared with the state of the test weed that did not subjected to the treatment, and "100" was a rating where the test plant was completely killed or the emergence or growth of the test plant was completely suppressed.

The harmful effect against crops was rated as "harmless" when little harmful effect was observed, "low" when a moderate level of harmful effect was observed, "medium" when a medium level of harmful effect was observed, and "high" when a high level of harmful effect was observed.

Example 1

In a plastic pot filled with soil are seeded glyphosate-resistant *Amaranthus palmeri* in which the number of copies of EPSPS gene has been increased, glyphosate-resistant waterhemp in which the number of copies of EPSPS gene has been increased, glyphosate-resistant *kochia* in which the number of copies of EPSPS gene has been increased, marestail which is resistant to glyphosate by involving an ABC transporter, Guernsey fleabane which is resistant to glyphosate by involving an ABC transporter, fleabane which is resistant to glyphosate by involving an ABC transporter, glyphosate-resistant goosegrass having Thr102Ile, glyphosate-resistant goosegrass having Pro106Ser, glyphosate-resistant goosegrass having Pro106Ala, glyphosate-resistant goosegrass having Pro106Leu, glyphosate-resistant goosegrass having Thr102Ile and Pro106Ser, glyphosate-resistant darnel having Thr102Ile, glyphosate-resistant darnel having Pro106Ser, glyphosate-resistant darnel having Pro106Ala, glyphosate-resistant darnel having Pro106Leu, volunteer glyphosate-tolerant soybean, and volunteer glyphosate-tolerant cotton. On the same day, the soil is treated with trifludimoxazin at the application rate of 6.25, 12.5, 25, 50, 100 or 150 g/ha. The amount of a liquid sprayed is 200 L/ha. Subsequently, the plants are cultivated in a greenhouse. Twenty-eight days after the treatment, a significant effect against the weeds is confirmed.

Example 2

In a plastic pot filled with soil are seeded glyphosate-resistant *Amaranthus palmeri* in which the number of copies of EPSPS gene has been increased, glyphosate-resistant waterhemp in which the number of copies of EPSPS gene has been increased, glyphosate-resistant *kochia* in which the number of copies of EPSPS gene has been increased, marestail which is resistant to glyphosate by involving an ABC transporter, Guernsey fleabane which is resistant to glyphosate by involving an ABC transporter, fleabane which is resistant to glyphosate by involving an ABC transporter, glyphosate-resistant goosegrass having Thr102Ile, glyphosate-resistant goosegrass having Pro106Ser, glyphosate-resistant goosegrass having Pro106Ala, glyphosate-resistant goosegrass having Pro106Leu, glyphosate-resistant goosegrass having Thr102Ile and Pro106Ser, glyphosate-resistant darnel having Thr102Ile, glyphosate-resistant darnel having Pro106Ser, glyphosate-resistant darnel having Pro106Ala, glyphosate-resistant darnel having Pro106Leu, volunteer glyphosate-tolerant soybean, and volunteer glyphosate-tolerant cotton. The plants are cultivated in a greenhouse for 21 days, and then trifludimoxazin is applied to foliage of the plants at application rate of 6.25, 12.5, 25, 50, 100 or 150 g/ha. The amount of a liquid sprayed is 200 L/ha. Subsequently, the plants are cultivated in a greenhouse. Fourteen days after the treatment, a significant effect against the weeds is confirmed.

Examples 3 to 4

The same procedures as in Examples 1 to 2 are carried out, except that the application of trifludimoxazin at application rate of 6.25, 12.5, 25, 50, 100 or 150 g/ha is changed to the application of trifludimoxazin and saflufenacil at application rate of 6.25+6.25, 12.5+12.5, 25+25, 50+50, 100+100, 150+150, 6.25+12.5, 12.5+25, 25+50, 50+100, 100+200, 12.5+6.25, 25+12.5, 50+25, 100+50 or 150+75 g/ha.

Examples 5 to 8

The same procedures as in Examples 1 to 4 are carried out, except that the weeds and volunteer crops are changed to those weeds and crops each of which further has the resistance/tolerance to ALS inhibitors.

Examples 9 to 12

The same procedures as in Examples 5 to 8 are carried out, except that the weeds and volunteer crops are changed to those weeds and volunteer crops each of which further has the resistance/tolerance to photosystem II inhibitors.

Examples 13 to 16

The same procedures as in Examples 9 to 12 are carried out, except that the weeds and volunteer crops are changed to those weeds and volunteer crops each of which further has the resistance/tolerance to HPPD inhibitors.

Examples 17 to 20

The same procedures as in Examples 13 to 16 are carried out, except that the weeds and volunteer crops are changed to those weeds and volunteer crops each of which further has the resistance/tolerance to PPO inhibitors.

Examples 21 to 24

The same procedures as in Examples 17 to 20 are carried out, except that the weeds and volunteer crops are changed to those weeds and volunteer crops each of which further has the resistance/tolerance to auxin-type herbicides.

Examples 25 to 28

The same procedures as in Examples 21 to 24 are carried out, except that the weeds and volunteer crops are changed to those weeds and volunteer crops each of which further has the resistance/tolerance to glutamine synthetase inhibitors.

Example 29

In a plastic pot filled with *soli* were seeded glyphosate-resistant *Amaranthus palmeri* in which the number of copies of EPSPS gene had been increased (produced by Azlin Seed Service) and glyphosate-sensitive *Amaranthus palmeri* (produced by Azlin Seed Service). The weeds were cultivated in a greenhouse for 18 days, and then an aqueous spray liquid [i.e., a liquid prepared by diluting a predetermined amount of a trifludimoxazin formulation (i.e., an emulsifiable concentrate prepared by mixing 20 parts of trifludimoxazin with 80 parts of a liquid cocktail (i.e., a mixture of 5 parts of cyclohexanone and 1 part of SORPOL 2680X (manufactured by TOHO Chemical Industry Co., Ltd.))) with water containing a spreading agent] was sprayed uniformly from above the weeds at the amount of 200 L/ha using a sprayer. Subsequently, the weeds were allowed to grow in a greenhouse for 14 days, and then the herbicidal effect was examined. As a reference example, the same procedure was carried out, except that the trifludimoxazin formulation was replaced with a predetermined amount of a glyphosate formulation (i.e., a soluble liquid containing 660 g/L of glyphosate potassium salt: "ROUNDUP MAXLOAD" (manufactured by Nissan Chemical Corporation). The results are shown in the table 1.

TABLE 1

| Compounds | Application rate g/ha | Effect on glyphosate-resistant Amaranthus palmeri | Effect on glyphosate-sensitive Amaranthus palmeri |
|---|---|---|---|
| Trifludimoxazin | 25 | 100 | 80 |
|  | 12.5 | 100 | 70 |
|  | 6.25 | 100 | 65 |
| Glyphosate potassium salt | 6160 | 70 | — |
|  | 1540 | 20 | 100 |
|  | 385 | — | 100 |

From the above-shown results, it was demonstrated that trifludimoxazin was effective particularly against glyphosate-resistant weeds and therefore was able to control the weeds effectively and was also able to reduce the populations of the weeds with high efficiency.

INDUSTRIAL APPLICABILITY

According to the method of controlling weeds of the present invention, it becomes possible to control weeds with high efficiency.

What is claimed is:

1. A herbicidal composition, comprising:
   trifludimoxazin; and
   at least one herbicide selected from the group consisting of glufosinate, glufosinate-P, and ammonium and sodium salts thereof,
   wherein a weight ratio of trifludimoxazin to the herbicide is from 1:5 to 1:100.

2. The herbicidal composition of claim 1, wherein the herbicide comprises glufosinate-P-ammonium.

3. The herbicidal composition of claim 1, wherein the herbicide comprises glufosinate-P-sodium.

4. A method of controlling a weed, comprising:
   applying trifludimoxazin and at least one herbicide selected from the group consisting of glufosinate, glufosinate-P, and ammonium and sodium salts thereof to the weed or a habitat of the weed,
   wherein a weight ratio of trifludimoxazin to the herbicide is from 1:5 to 1:100.

5. The method of claim 4, wherein the weed is a member of genus *Amaranthus*.

6. The method of claim 4, wherein the weed is *Amaranthus palmeri*.

7. The method of claim 4, wherein trifludimoxazin and the herbicide are applied in a cultivation area for a crop.

8. The method of claim 7, wherein the crop is at least one selected from the group consisting of soybean, corn, cotton, rapeseed, rice, wheat, barley, sugar cane, sugar beet, sorghum and sunflower.

9. The method of claim 7, wherein the crop is tolerant to trifludimoxazin.

10. The method of claim 4, wherein the herbicide comprises glufosinate-P-ammonium.

11. The method of claim 4, wherein the herbicide comprises glufosinate-P-sodium.

* * * * *